(No Model.)
E. P. SMITH.
VETERINARY INCISOR CUTTER.
No. 341,956. Patented May 18, 1886.
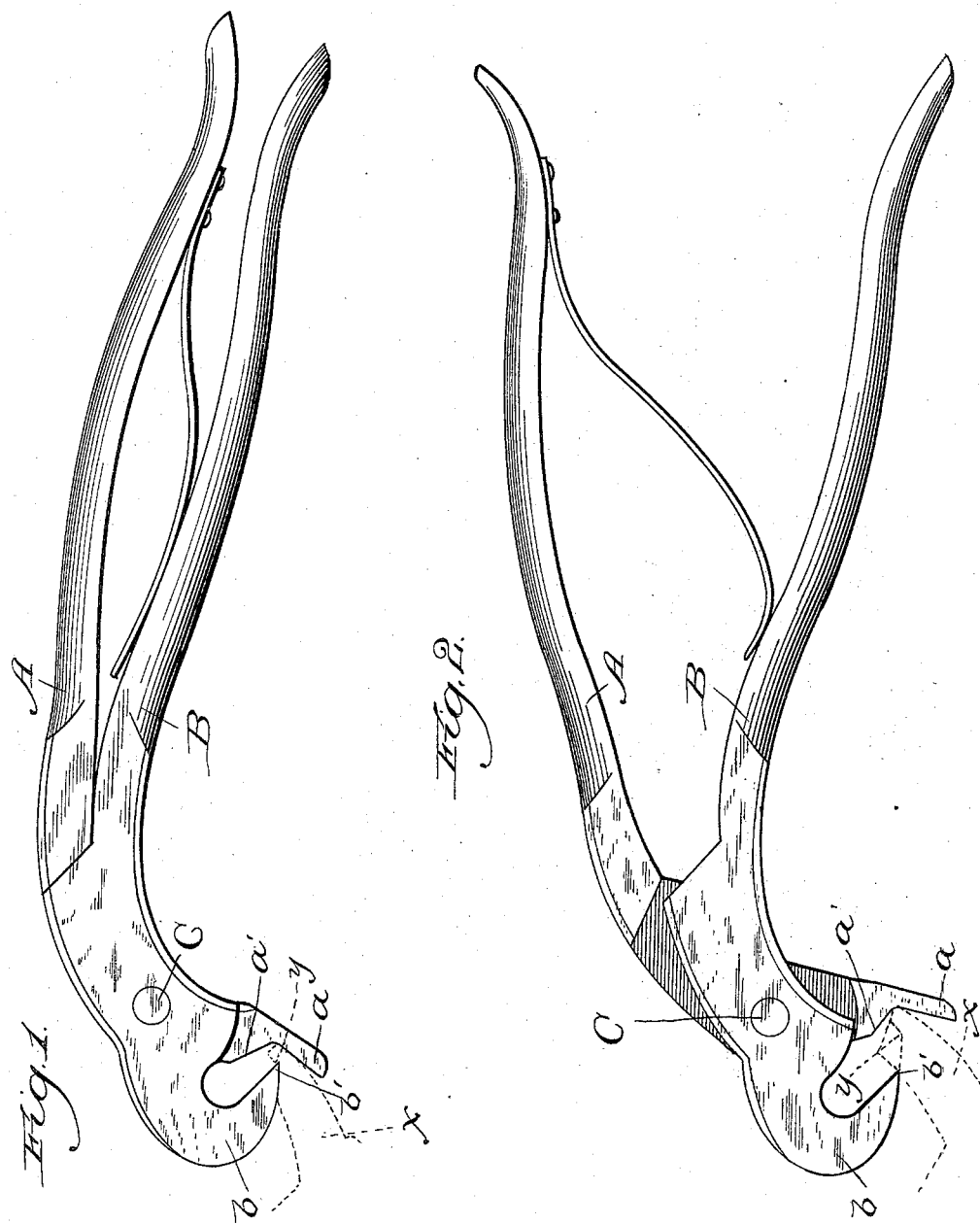
Witnesses:
Chas. E. Gaylord.
Chas. E. Sayre,
Inventor:
Emery P. Smith
By Charles T. Brown
Atty.

United States Patent Office.

EMERY P. SMITH, OF CHICAGO, ILLINOIS, ASSIGNOR OF TWO-THIRDS TO CHARLES E. SAYRE, OF SAME PLACE, AND THOMAS E. DRAKE, OF LEBANON, OHIO.

VETERINARY INCISOR-CUTTER.

SPECIFICATION forming part of Letters Patent No. 341,956, dated May 18, 1886.

Application filed April 3, 1886. Serial No. 197,631. (No model.)

*To all whom it may concern:*

Be it known that I, EMERY P. SMITH, a citizen of the United States, residing at Chicago, in the county of Cook and State of Illinois, have invented certain new and useful Improvements in Horse-Incisor Cutters for Cutting and Shaping the Incisor-Teeth of Horses, of which the following is a specification.

As is well known to those skilled in the art, the base of the tooth of a horse is not entirely covered with enamel, and from that part which is thus free from enamel there extends upward toward the root of the tooth, and in about the center thereof, a part or portion softer and more yielding than the remainder; and, as is also well known, the teeth of a horse are at all times subject to and frequently do become uneven upon the base or meeting surfaces, and it is therefore necessary, or at least highly desirable, that they be reshaped by cutting away the unevenness or projections thereon, and in practice it has been found difficult to thus cut and reshape such uneven teeth without splitting the same longitudinally by the instruments heretofore used for such purposes when the same are applied thereto.

The object of my invention is to produce an incisor cutter and shaper by means of which the incisor-teeth of a horse may be easily and quickly cut and shaped without splitting longitudinally, and thus permanently and seriously injuring, if not destroying, the same, and without other and different injury thereto.

I have illustrated my invention by the drawings accompanying this specification and forming a part hereof, in which—

Figure 1 is a plan of my invention closed, and indicating by dotted lines the outlines of a horse incisor-tooth. Fig. 2 is a plan view of my invention open, and indicating by dotted lines a horse incisor-tooth placed therein.

Like letters refer to like parts throughout the several views.

A and B are arms or levers of my improved incisor-cutter.

C is the pivot upon which arms A B partially rotate.

*a a'* are shoulders or projections forming the head of arm A.

*b* is the head of arm B, having cutting-edge *b'* thereon.

*x* is the outline of a horse-incisor.

*y* is a dotted line indicating the manner in which tooth X is cut and shaped by cutting-edge *b'*.

Cutting-edge *b'* on head *b*, when closed, does not come in contact with the inner surface of shoulder *a a'*, or either of them, being separated therefrom, as illustrated in Fig. 1, a short distance—say one-sixteenth of an inch, or thereabout.

The manner in which my invention is used is as follows: Arms A B are opened and the cutter placed over the tooth in about the position illustrated in Fig. 2, with the shoulders *a a'* pressing against the lower edge and base of the tooth. Arms A B are then brought together by the operator, and a portion of the inner and under surface of the tooth shaved or cut off. This is repeated until the tooth has been cut and shaped on or near to dotted line *y* of Fig. 2. The cutting-edge *b'* of head *b* not coming against edge of shoulder *a* or *a'*, a portion of the front and lower portion or part of the tooth remains uncut, as illustrated in Fig. 1. This uncut portion of the tooth may be removed by a common cutting-forcep without danger of splitting the tooth, the whole being afterward finished with a file, if desired. By the peculiar motion given to jaw *b* and cutting-edge *b'* in relation to the inner surface of shoulders or projections *a a'*, when my incisor cutter and shaper is in use, a clean and perfect cut is obtained in the tooth of the desired shape without injury to the tooth.

What I claim, and desire to secure by Letters Patent, is—

The combination, in a horse-incisor cutter, of arm A, having head *a* and shoulder *a'*, with arm B, having head *b* and cutting-edge or scraper *b'*, all substantially as described, and for the purpose set forth.

EMERY P. SMITH.

Witnesses:
   CHAS. E. SAYRE,
   CHARLES T. BROWN.